Feb. 26, 1952
T. PLACETTE
2,587,212
RELIEF VALVE
Filed April 20, 1946
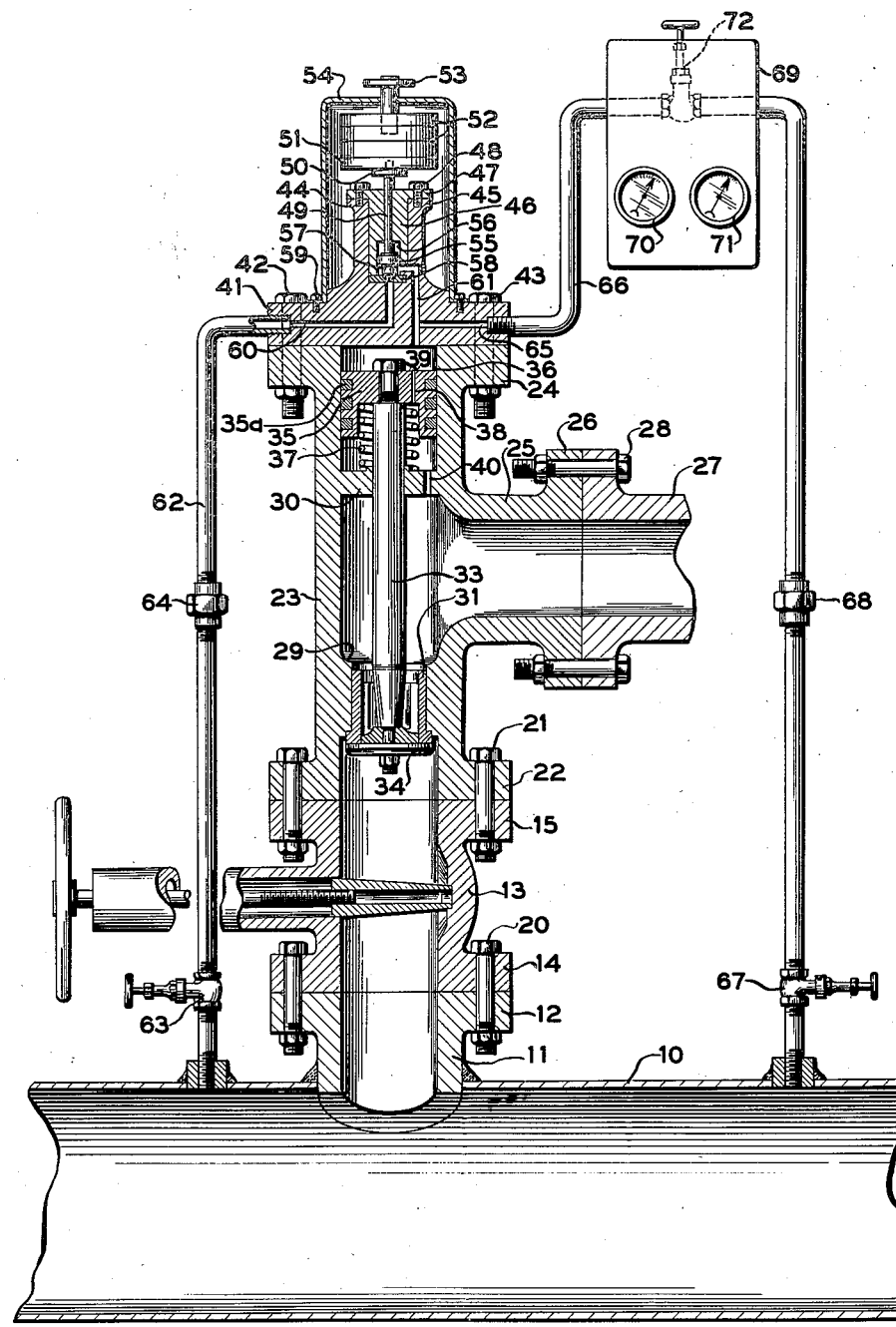
INVENTOR.
Theodor Placette
BY
ATTORNEY Patented Feb. 26, 1952

2,587,212

UNITED STATES PATENT OFFICE 2,587,212

RELIEF VALVE

Theodore Placette, San Marcos, Tex.

Application April 20, 1946, Serial No. 663,677

1 Claim. (Cl. 137—53)

This invention relates to improvements in valves and particularly to a pilot controlled pressure relief valve constructed and arranged to also function as a by-pass valve by remote control.

Pilot controlled pressure relief valves have been previously proposed wherein fluid pressure above a predetermined degree in a container or conduit to which the valve is operatively connected is effective to open the valve and permit some of the fluid to escape, thus relieving the pressure. The degree of pressure at which the valve operates is determined by the setting of the pilot valve.

These previously proposed relief valves have various defects and operational and service difficulties which it is among the objects of the present invention to overcome.

Such previously proposed valves have included parts of intricate shape that are difficult and expensive to manufacture, requiring a large number of special machining operations. Such intricate parts are also not satisfactory in service as they are frequently structurally weak and are subject to concentrated stresses under the expansion and contraction effects of temperature and pressure changes. Such previously proposed valves are also so designed that a substantially complete disassembly of the entire valve is necessary to adjust or repair either the main valve or the pilot valve component.

The previously proposed valves have also usually required diaphragms or packing glands for the movable stems, which tend to cause sticking or leakage of the valve.

It is therefore among the objects of the present invention to provide a pilot controlled pressure relief valve composed of a few simple parts which can be manufactured by simple operations such as turning and boring, which are not subject to destructive stress concentrations under the expansion and contraction effects of temperature and pressure changes, which are so assembled that either the pilot valve or the main valve subassembly may be removed or adjusted without disturbing the adjustment of the other subassembly and which render satisfactory service without the use of packing glands or diaphragms.

It is also an object to provide an improved valve and valve operating assembly that can be used either as a pressure relief valve or a by-pass valve without the necessity of changing any of the valve parts or any valve adjustment.

It is a further object to provide a pressure relief and by-pass valve assembly including cut-off valves to facilitate servicing of the valve assembly without necessitating discontinuation of pressure conditions in the container or conduit to which the valve assembly is operatively connected.

Other objects and advantages will be obvious to those skilled in the art or will become apparent from a consideration of the following description and the accompanying drawings.

In the drawings:

The single figure is a vertical sectional view of a valve illustrative of the invention.

With continued reference to the drawing, a conduit member 10 is provided with a lateral flanged connection 11 to which the valve structure may be conveniently attached. The conduit 10 may be a conduit for high pressure fluid, such as an oil line. The valve could, however, be applied to other fluid conduits or containers such as a high pressure water system or a high pressure gas main.

Connected to the flange 12 of a connection or second conduit 11 is a cut-off assembly illustrated as a gate type shut-off valve having a housing 13 provided with end flanges 14 and 15. The gate valve may be conventional in form and need not be described in detail.

The gate valve flange 14 is secured to flange 12 by suitable means such as through bolts 20, and its flange 15 is secured by suitable bolts 21 to an external end flange 22 of a main valve housing 23. The housing 23 is generally cylindrical in form and is provided at the end opposite flange 22 with a similar external flange 24 and between the flanges 22 and 24 with a lateral exit opening or outlet 25 having at its end an external flange 26 to which is secured the flanged end of a pipe or conduit 27 by suitable means, such as the through bolts 28.

If the conduit 10 is connected to the outlet of a pump, as is usually the case in oil lines, the pipe 27 may be led back to the pump inlet or it may be led to a parallel line or other receptacle as may be found convenient or desirable. Within the housing 23 there is a pair of shoulders defining a thickened wall portion 29, provided with a cylindrical bore smaller in diameter than the remainder of the valve body interior, and a transverse partition 30. The portion 29 and partition 30 are located substantially at the opposite sides of lateral opening 25. A cylindrical valve seat 31 is press-fitted in the bore of body portion 29. A cylindrical valve stem 33 extends through the bore of portion 29 and through an aperture in partition 30 and carries at its lower end a valve head 34 which cooperates with the seat 31 and at its upper end a piston 35 slidable in a cylinder 36 provided in the open end portion of housing 23 beyond the internal flange or partition 30. A spring 37 urges the valve to closed position and fluid pressure acting on the head of piston 35 is effective to open the valve against the force of the spring the area of piston 35 being greater than that of valve head 34. Any fluid trapped in the space above the piston is drained through a restricted opening 38 in the piston head which opening may be provided with a check valve 39, such fluid escaping through the opening 38 may pass through a suitable opening 40 in the partition 30 to the relief pipe or conduit 27.

Piston 35 is provided with grooves for packing rings 35a to prevent leakage between the piston 35 and cylinder 36.

A pilot valve body 41 is mounted on flange 24 by suitable means, such as the through bolts 42, and comprises a flat generally cylindrical base portion 43 from one side of which extends an elongated hollow cylinder 44 substantially coaxial with the base portion and provided at its outer end with an external flange 45.

A bushing 46 having at one end an external flange 47 is fitted into the cylinder 44 and secured therein by suitable means, such as cap screws 48, and a pilot valve member has its stem 49 slidable in an aperture in the bushing 46. The stem 49 is lap fitted into the bushing to avoid any leakage of fluid between the stem and the bushing. At its upper end the stem extends into a well in a weight table 51 in a manner to support the table for carrying suitable weights 52. A lifting rod 53 extends through the top weight and is secured in the weight immediately below so that the two top weights may be manually lifted for testing the valve.

On its lower end the stem 49 carries a cylindrical guide 55 slidable in a counterbore 56 in the corresponding end of bushing 46 and below the guide is a valve member 57 having a tapered end cooperating with a tapered aperture in a valve seat 58.

The valve seat 58 is formed of a hard, wear-resisting material. The valve cover 54 is detachably secured to the pilot valve body 41 by suitable means, such as cap screws 59 passing through an external flange on the lower open end of the cover and into screw-threaded apertures in the pilot valve body.

A fluid channel 60 leads through the base portion of the pilot valve body from the exterior thereof to the aperture in valve seat 58 and a second channel 61 leads from the interior of counterbore 56 above the valve seat to the upper end of cylinder 36 in the main valve body. The outer end of channel 60 is connected through a tube or first auxiliary fluid conduit 62 with the interior of the conduit 10, a manually controllable cut-off valve 63 being disposed in the line 62 between the conduit 10 and pipe union 64.

A third channel 65 branches from the channel 61, or may be led directly from the counterbore 56 through the base portion of the pilot valve body to the exterior thereof where it is connected with one end of a tube or second auxiliary conduit 66, the other end of which is connected with the interior of the conduit 10. A cut-off valve 67 may be disposed in this line between the conduit 10 and the pipe union or coupling 68. The fluid line 66 passes across a gauge panel 69 carrying gauges 70 and 71 and a manually controllable valve 72 is connected into the portion of line 66 passing across the gauge board to control the flow of fluid therethrough. The valve is placed on the gauge board for convenience of the operator but could be in some other location if desired.

With the valve 72 closed and the main valve assembly operating as an automatic pressure relief valve, when pressure in conduit 10 exceeds a certain predetermined value for which the relief valve is set, the pressure of the fluid acting on the lower end of valve member 57 will raise this valve member against the force of the weights 52 and connect the channel 60 with the channel 61 which will permit fluid under pressure to flow into the upper end of cylinder 36 and force the piston 35 downwardly moving the valve head 34 away from its seat to open the valve. Fluid will then flow from conduit 10 past the valve head and out through the connection 25 and pipe 27 to the pump intake or other receptacle provided for the exhaust fluid from the relief valve. Fluid will be discharged through the relief valve until the pressure in conduit 10 has returned to the predetermined value at which time the pilot valve will close, cutting off flow of fluid under pressure to cylinder 36. Spring 37 will then raise piston 35, the fluid trapped above the piston escaping through openings 38 and 40, until the valve head 34 is again in closed association with the seat 31.

Regardless of the pressure in conduit 10, so long as it is sufficient to overcome the force of spring 37, when valve 72 is opened fluid under pressure from the conduit will be admitted directly to cylinder 36 to open the valve and cause a discharge of fluid through pipe 27. By means of this manual control the valve may be used as a by-pass valve in addition to its function as an automatic pressure relief valve.

When it is desired to remove or service the pressure relief valve, the valves 63 and 67 and the gate valve 13 may be closed, thus cutting the relief valve off from the conduit 10. The relief valve may then be disassembled or removed without spillage of any fluid from the conduit. Also, if it is desired to have the valve function solely as a by-pass valve the valve 63 may be closed, thereby eliminating its function as an automatic pressure relief valve.

It will be obvious to those skilled in the art that various changes may be made in the invention without departing from the spirit and scope thereof and therefore the invention is not limited by that which is shown in the drawing and described in the specification but only as indicated in the appended claim.

What is claimed is.

The combination comprising a first fluid conduit, a second conduit in communication with said first conduit, a shut off valve having an inlet and an outlet with said inlet in communication with said second conduit, a pilot operated main valve attached to said shut off valve, the inlet of said main valve being in communication with the outlet of said shut off valve, said main valve having an outlet, a main valve head positioned between the inlet and outlet of said main valve for controlling the flow of fluid through said main valve, a first auxiliary fluid conduit providing communication between said pilot valve and said first fluid conduit for controlling the main valve head in accordance with the pressure in said first fluid conduit, a first auxiliary shut off valve in said first auxiliary conduit for shutting off the flow of fluid therethrough for rendering said pressure control inoperative, a second auxiliary conduit providing communication between said first fluid conduit and said pilot valve for operating said main valve head when fluid pressure passes therethrough, and a second auxiliary shut off valve for shutting off the flow of fluid through said second auxiliary conduit, said first and second auxiliary conduits having couplings positioned between said auxiliary shut off valves and said pilot valve.

THEODORE PLACETTE.

REFERENCES CITED

The following references are of record in the file of this patent:

UNITED STATES PATENTS

| Number | Name | Date |
|---|---|---|
| 72,189 | Goll | Dec. 17, 1867 |
| 763,881 | Haller | June 28, 1904 |
| 1,160,285 | Hobbs | Nov. 16, 1915 |
| 2,408,708 | Tweedle | Oct. 1, 1946 |